(12) United States Patent
Devi et al.

(10) Patent No.: US 7,863,398 B2
(45) Date of Patent: Jan. 4, 2011

(54) PROCESS FOR MAKING HYDROLYZABLE SILYLATED POLYMERS

(75) Inventors: Mayanglambam Rebika Devi, Bangalore (IN); Narayana Padmanabha Iyer, Trivandrum (IN); Suneel Kunamaneni, Bangalore (IN); Anantharaman Dhanabalan, Bangalore (IN); Arakali Sreenivasarao Radhakrishna, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 828 days.

(21) Appl. No.: 11/728,898

(22) Filed: Mar. 27, 2007

(65) Prior Publication Data

US 2008/0242825 A1  Oct. 2, 2008

(51) Int. Cl.
*C08G 77/26* (2006.01)

(52) U.S. Cl. .......................................... 528/28; 528/29

(58) Field of Classification Search .................... 528/28, 528/29
See application file for complete search history.

(56) References Cited

U.S. PATENT DOCUMENTS

| 3,494,951 | A | | 2/1970 | Berger |
| 3,607,901 | A | * | 9/1971 | Berger .......................... 556/414 |
| 3,821,218 | A | | 6/1974 | Berger |
| 4,345,053 | A | | 8/1982 | Rizk et al. |
| 4,625,012 | A | | 11/1986 | Rizk et al. |
| 5,703,159 | A | | 12/1997 | Ichinohe et al. |
| 5,900,458 | A | | 5/1999 | Fujita et al. |
| 5,905,150 | A | | 5/1999 | Simonian et al. |
| 5,990,257 | A | | 11/1999 | Johnston et al. |
| 6,124,384 | A | | 9/2000 | Shiraishi et al. |
| 6,310,170 | B1 | | 10/2001 | Johnston et al. |
| 6,369,187 | B1 | | 4/2002 | Fujita et al. |
| 6,423,661 | B1 | | 7/2002 | McGraw et al. |
| 6,432,865 | B1 | | 8/2002 | McGraw et al. |
| 6,833,423 | B2 | | 12/2004 | Roesler et al. |
| 2002/0198352 | A1 | | 12/2002 | Tanaka et al. |
| 2004/0181025 | A1 | * | 9/2004 | Schindler et al. .............. 528/38 |
| 2008/0221238 | A1 | * | 9/2008 | Su et al. ...................... 523/435 |

FOREIGN PATENT DOCUMENTS

WO  WO 02/068501 A3  9/2002

* cited by examiner

*Primary Examiner*—Margaret G Moore
(74) *Attorney, Agent, or Firm*—Dominick G. Vicari; Joseph S. Ostroff

(57) ABSTRACT

An improved process for preparing hydrolyzable polymers, the process includes, inter alia, reacting certain silylorganohalide compounds with a salt of a cyanate in the presence of active hydrogen containing polymers.

28 Claims, No Drawings

PROCESS FOR MAKING HYDROLYZABLE SILYLATED POLYMERS

FIELD OF THE INVENTION

This invention relates to a novel process of preparing certain hydrolyzable silylated polymers, particularly alpha-substituted alkyl alkoxy silyl-terminated polymers, by reacting a certain silylorganohalide, particularly an alpha-substituted haloalkylalkoxysilane, with a salt of cyanate in the presence of active hydrogen-functional polymers.

BACKGROUND OF THE INVENTION

Hydrolyzable silylated polymers are useful to make room temperature and moisture curable compositions, such as coatings, adhesives, gaskets, sealants and the like. Inherently fast moisture cure characteristics of alpha-substituted alkyl hydrolyzable silyl-terminated polyurethane polymers, in comparison to their gamma-substituted counterparts, make them desirable, as they potentially allow the use of lesser amounts of environmentally hazardous tin catalysts and offer Hazardous Air Pollutants (HAPs) free curing compositions.

The preparation of hydrolyzable silylated polymers is generally known in the art. A commonly used commercial method for making hydrolyzable silylated polymers generally involves two steps. The first step comprises the synthesis of isocyanato-substituted hydrolyzable silane by heating the corresponding carbamato-functional hydrolyzable silane at elevated temperatures and under reduced pressures. This step requires the inefficient and costly cracking of the carbamato-functional silane in specialized reactors that allow for the parallel and efficient separation of thereby formed isocyanato-functional silane from its reactants and byproducts, and subsequent purification. Due to high reactivity of the isocyanato-substituted silanes, special care is required to prevent the polymerization of the isocyanato group and hydrolysis of the silyl group during storage of these materials, prior to use. In the second step, the isocyanato-functional silane is reacted with active hydrogen containing polymers, such as polyols, in a differently configured reactor.

Inventively, it has now been discovered that, one can make hydrolyzable silylated polymers in one-step, without the need to first make, purify and store the isocyanato-functional silanes and subsequently to react them with corresponding active hydrogen-functionalized polymers.

SUMMARY OF THE INVENTION

The present invention provides a process for making moisture curable and hydrolyzable silylated polymer which comprises reacting under substantially anhydrous conditions (a) at least one hydrolyzable halohydrocarbylsilane, (b) at least one salt of a cyanate, and (c) at least one active hydrogen containing polymer, and, optionally, at least one catalyst and/or inert solvent, and, optionally, at elevated temperatures.

The hydrolyzable silylated polymers of the present invention make them suitable for coatings, adhesives and sealants in the applications of construction, automotive, marine, aerospace, consumer and industry.

DETAILED DESCRIPTION OF THE INVENTION

The present invention is directed to a new one-step process of making hydrolyzable silylated polymers. In this inventive process, "in-situ" generated isocyanatohydrocarbylsilane which is obtained by the reaction of halohydrocarbylsilane containing at least one hydrolyzable group with a salt of cyanate, reacts with an active hydrogen polymer, optionally in an organic solvent and/or in the presence of catalysts and optionally at elevated temperatures, to obtain a hydrolyzable silylated polymer.

The one-step process of making hydrolyzable silylated polymers involves in-situ trapping of the isocyanatohydrocarbylsilane, generated by the reaction of halohydrocarbylsilane with a salt of cyanate optionally in an organic solvent, by the hydrogen active polymers and more specifically hydroxyl-functional polymers.

As such, the present process can utilize different types of active hydrogen containing polymers. In one embodiment, these active hydrogen containing polymers include hydroxyl-functional polymers such as the non-limiting examples of polyethylene glycol of various molecular weights; polypropylene glycols of various molecular weights; polyols based upon alpha-substituted glycols, such as polybutylene glycol, polyhexylene glycol, and the like; polyurethanes formed by reacting polypropylene glycols, polyethylene glycols, copolymers of polyethylene glycol and polypropylene glycol and the like; copolymers of polyethylene glycol and polypropylene glycol; polyester polyols; polycarbonate polyols; polybutadiene diols; polycaprolactone diols; silanol; aliphatic diols with siloxane backbone; triols and higher functionality polyols, such as tetraols and pentaols; any other active hydrogen containing compounds such as primary and secondary amines, e.g., Jeffamine (amine terminated polypropylene glycol); and carboxylic acids and the like, can be used in this reaction.

In another embodiment, suitable polyols include polyether polyol, polyetherester polyols, polyesterether polyols, polybutadiene polyols, acrylic component-added polyols, acrylic component-dispersed polyols, styrene-added polyols, styrene-dispersed polyols, vinyl-added polyols, vinyl-dispersed polyols, urea-dispersed polyols, and polycarbonate polyols, polyoxypropylene polyether polyol, mixed poly (oxyethylene/oxypropylene) polyether polyol, polybutadienediols, polyoxyalkylene diols, polyoxyalkylene triols, polytetramethylene glycols, polycaprolactone diols and triols, and mixtures of polyols of varying active hydrogen content, such as monols, diols, triols and higher functionality polyols.

In still another embodiment, specific non-limiting examples of polyether polyols are polyoxyalkylene polyol, particularly linear and branched poly (oxyethylene) glycol, poly (oxypropylene) glycol, copolymers of the same and combinations thereof. Graft or modified polyether polyols, typically called polymer polyols, are those polyether polyols having at least one polymer of ethylenically unsaturated monomers dispersed therein. Non-limiting representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols comprise dispersed polymeric solids. Suitable polyesters of the present invention, include but are not limited to aromatic polyester polyols such as those made with phthalic anhydride (PA), dimethylterephthalate (DMT) polyethyleneteraphthalate (PET) and aliphatic polyesters, and the like. In one embodiment of the present invention, the polyether polyol is selected from the group consisting of ARCOL® polyol U-1000, Hyperlite® E-848 from Bayer AG, ACCLAIM® 8200 and 12200 from Bayer AG, Voranol® Dow BASF, Stepanpol® from Stepan, Terate® from Invista and combinations thereof.

Similarly, hydroxyl group terminated polyurethanes obtained by reacting different polyols as listed herein above, with different diisocyanates and/or polyisocyanates, such as the non-limiting examples of diisocyanates such as 2,4-toluene diisocyanate (TDI), 2,6-toluene diisocyanate, 4,4'-diphenyl-methanediisocyanate (MDI), 2,4'-diphenyl-methanediisocyanate, isophorone diisocyanate ("IPDI"), 4,4'-dicyclohexylmethane-diisocyanate isomers, hexamethylene diisocyanate (HDI), Desmodur N and the like, and mixtures thereof.

The molecular weight of the polyols or hydroxyl-terminated polyurethanes is specifically in the range between 300 and 25,000 grams per mole, more specifically between 1,000 and 16,000 grams per mole, even more specifically between 5,000 and 14,000 grams per mole and most specifically between 8,000 and 12,000 grams mole, as measured by gel permeation chromatography, against polystyrene standards.

To prepare active hydroxyl-terminated polyurethanes useful in this invention, at least a slight molar excess of the hydroxyl equivalents (—OH groups) with respect to the isocyanato equivalents (—NCO groups) is employed to terminate the polymer chains with hydroxyl groups. The specific molar ratio of the NCO to OH is from about 0.2 to 0.95, and more specifically between 0.5 and 0.85, depending on the polyol in use.

In one embodiment herein, the reactant employed in the practice of this present invention to prepare the hydroylsable silylated polymer is one or more hydrolyzable halo-substituted hydrocarbylsilane according to Formula (1):

$$YG^1SiX^1X^2X^3 \qquad (1)$$

wherein:

each occurrence of Y is independently selected from the group consisting of chloro, bromo and iodo;

each occurrence of $G^1$ is independently a divalent hydrocarbylene group, optionally containing heteroatom-substituted with one or more oxygen atoms, and selected from the group comprising alkylene, alkenylene and aralkylene containing from 1 to 20 carbon atoms;

each occurrence of $X^1$ is independently a hydrolyzable group selected from the group consisting of $R^1O$—, $R^1C(=O)O$—, $R^1R^2C=NO$—, and $R^1R^2NO$—, wherein each occurrence of $R^1$, $R^2$ and $R^3$ is independently a monovalent hydrocarbyl selected from the group consisting of hydrogen, and alkyl, alkenyl, aryl, and aralkyl containing from 1 to 10 carbon atoms;

each occurrence of $X^2$ is independently selected from the group consisting of $R^1O$—, $R^1C(=O)O$—, $R^1R^2C=NO$—, $R^1R^2NO$— and $R^3$—, wherein each occurrence of $R^1$, $R^2$ and $R^3$ is independently a monovalent hydrocarbyl selected from the group consisting of hydrogen, and alkyl, alkenyl, aryl, and aralkyl containing from 1 to 10 carbon atoms; and each occurrence of $X^3$ is independently selected from the group consisting of $R^1O$—, $R^1C(=O)O$—, $R^1R^2C=NO$—, $R^1R^2NO$— and $R^3$—, wherein each occurrence of $R^1$, $R^2$ and $R^3$ is independently a monovalent hydrocarbyl selected from the group consisting of hydrogen, and alkyl, alkenyl, aryl, and aralkyl containing from 1 to 10 carbon atoms.

In one embodiment, specific non-limiting examples of Y are Cl—, Br— and I—, more specifically Br— and Cl—, and most specifically Cl—.

In another embodiment, the $G^1$ is specifically a hydrocarbylene group in which the carbon atom that is substituted with the Y group is a primary carbon atom. In still another embodiment, when the $G^1$ groups contains at least two carbon atoms, the carbon atom adjacent to the carbon containing the Y group contains at least one hydrogen and more specifically two hydrogen atoms. In yet another embodiment, specific non-limiting examples of $G^1$ include alkylene, such as methylene, ethylene, propylene, butylenes, 3-methyl pentylene, bis-(ethylene)cyclohexane; alkenylene such as —CH$_2$CH=CH—, —CH$_2$CH=CHCH$_2$—, —CH$_2$CH$_2$CH(CH$_3$)=CH$_2$CH$_2$—; aralkylene, such as —CH$_2$CH$_2$C$_6$H$_4$CH$_2$CH$_2$—, —CH$_2$CH$_2$OC$_6$H$_4$OCH$_2$CH$_2$—, wherein C$_6$H$_4$ represents a phenylene group, and the like.

In another embodiment, $X^1$ is $R^1O$— including the specific non-limiting examples of methoxy, ethoxy, isopropoxy, propoxy, butoxy and more specifically methoxy and ethoxy.

In yet another embodiment, $X^2$ and $X^3$ are selected from the group consisting of $R^1O$—, including the specific non-limiting examples of methoxy, ethoxy, isopropoxy, propoxy, butoxy and more specifically methoxy and ethoxy; and $R^3$—, including the specific non-limiting examples of methyl, ethyl, propyl, phenyl, 2-phenylethyl and more specifically methyl and ethyl.

In one embodiment of the present invention the hydrolyzable alpha-chloromethylsilanes suitable to use is at least one selected from the group consisting of chloromethyltriethoxysilane, chloromethyltrimethoxysilane, chloromethyltripropoxysilane, chloromethyldiethoxymethylsilane, chloromethyldimethoxymethylsilane, chloromethyldipropyloxymethylsilane, chloromethylethoxydimethylsilane, chloromethylmethoxydimethylsilane and mixtures thereof.

In another embodiment of the present invention, the hydrolyzable halohydrocarbylsilane suitable to use is at least one selected from the group consisting of 2-chloroethyltriethoxysilane, 3-chloropropyltrimethoxysilane, 6-chlorohexyltripropoxysilane, 2-chloroethyldiethoxymethylsilane, 3-chloropropyldimethoxymethylsilane, 4-(2-chloroethyl)phenyldipropyloxymethylsilane, 2-chloroethylethoxydimethylsilane, 3-chloropropylmethoxydimethylsilane and mixtures thereof.

The time necessary to cure the hydrolyzable silylated polymers is dependent in part upon the structure of the $G^1$ group. The hydrolyzable silylated polymers that contain only a single carbon atom between the silicon atom and the nitrogen atom of the carbamate functional group hydrolyze much more rapidly than when two or more carbon or oxygen atoms separate the silicon atom and nitrogen atom. Divalent hydrocarbylene $G^1$ groups that are cyclic or branch further slow down the curing rate. In an embodiment, mixtures of hydrolyzable halohydrocarbylsilanes can be used in the method for preparing hydrolyzable silylated polymers to achieve desirable curing rates. Specific non-limiting examples of the reactants include mixtures of chloromethyltrimethoxysilane and 3-chloropropyltrimethoxysilane, chloromethyltrimethoxysilane and 5-chloro-3-methylpentyltrimethoxysilane, chloromethyltrimethoxysilane and 2-chloroethylyltrimethoxysilane and the like. The molar ratios of haloalkylsilanes in which $G^1$ is one carbon to haloalkylsilanes in which $G^1$ is 2 to 30 carbon atoms is from about 95 to 5, more specifically from about 80 to 20 and most specifically from about 80 to 60. In another embodiment, hydrolyzable silylated polymers containing different $G^1$ groups can be mixed together.

According to another embodiment of the process of this invention, another reactant of the process of the present invention is a salt of cyanate, which is reacted with the hydrolyzable halohydrocarbylsilane in the presence of an active hydrogen containing polymer to produce a hydrolyzable silylated polymer. The cyanates which may be employed in the practice of this invention are metal cyanates, for example, but not limited thereto, lithium, sodium, potassium, rubidium, barium, strontium, silver, lead, mercury, calcium cyanates, and the like, and ammonium cyanate and phosphonium cyanate. According to one specific embodiment of the process of the invention, the cyanate is potassium cyanate.

In another embodiment of this invention, the novel process is employed to produce an hydrolyzable silylated polymer by reacting a salt of cyanate, with a hydrolyzable halohydrocarbylsilane and an active hydrogen containing polymer, such as the non-limiting example of a hydroxyl-functional polymer, in the presence of a phase-transfer catalyst at elevated temperatures and either at a controlled rate of reaction or controlled reaction conditions such as reaction temperature and catalyst amount.

Examples of phase transfer catalysts include quaternary phosphonium salts such as tetra-n-butylphosphonium bromide, tetra-n-butylphosphonium chloride, methyltri-n-butylphosphonium chloride, methyltri-n-butylphosphonium bromide, n-butyltriphenylphosphonium bromide, n-butyltriphenylphosphonium chloride, methyltriphenylphosphonium chloride and methyltriphenylphosphonium bromide, with particular preference being given to methyltriphenylphosphonium chloride, n-butyltriphenylphosphonium bromide and tetra-n-butylphosphonium bromide.

According to another embodiment of the invention, the novel process to produce a hydrolyzable silylated polymer can be carried out in the presence or absence of an organic solvent, but use of an organic solvent, in particular a polar aprotic solvent, is preferred. When an organic solvent is used, the amount is preferably from 100 to 1000 percent by weight, more preferably from 20 to 800 percent by weight, and most preferably from 400 to 600 percent by weight, in each case based on the amount of hydrolyzable halocarbylsilane compound supplied.

Examples of organic, polar aprotic solvents include those which aid the reaction, for instance acetone, N,N-dimethylformamide, dimethyl sulfoxide, N-methyl-2-pyrrolidone, gamma-butyrolactone, diethylene glycol dimethyl ether and diethylene glycol diethyl ether, with preference being given to acetone, N,N-dimethylformamide and N-methyl-2-pyrrolidone, most preferably N,N-dimethylformamide.

According to one specific embodiment of the invention, the solvent is dimethylformamide.

According to an embodiment of the invention, the novel process to produce a hydrolyzable silylated polymer is carried out either at room temperature or at elevated temperatures from about 80 to about 140° C. In another embodiment of the invention, the process is carried out at a temperature from about 90 to about 120° C. In yet another embodiment of the invention, the process is carried out at a temperature from about 100 to about 110° C.

Additional catalyst can be employed in the process of the present invention. Suitable additional catalysts include organoamine and organotin compounds for this purpose. Other metal catalysts can be used in place of, or in addition to, organotin compound. Suitable non-limiting examples of additional catalysts include tertiary amines such as bis(2,2'-dimethylamino)ethyl ether, trimethylamine, triethylenediamine, 1,8-diazabicyclo[5.4.0]undec-7-ene, triethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine, 2-{[2-(2-dimethylaminoethoxy)ethyl]methylamino}ethanol, pyridine oxide, and the like; strong bases such as alkali and alkaline earth metal hydroxides, alkoxides, phenoxides, and the like; acidic metal salts of strong acids such as ferric chloride, stannous chloride, antimony trichloride, bismuth nitrate and chloride, and the like; chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; alcoholates and phenolates of various metals such as $Ti(OR)_4$, $Sn(OR)_4$, $Sn(OR)_2$, $Al(OR)_3$, and the like, wherein R is alkyl or aryl of from 1 to about 12 carbon atoms, and reaction products of alcoholates with carboxylic acids, beta-diketones, and 2-(N,N-dialkylamino)alkanols, such as well known chelates of titanium obtained by this or equivalent procedures; salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaureate, dibutyltin maleate, dilauryltin diacetate, dioctyltin diacetate, dibutyltin-bis(4-methylaminobenzoate), dibuytyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like, and combinations thereof.

In accordance with one embodiment of the present invention, one and two-part sealant, adhesive or coating formulations incorporating the above hydrolsable silylated polymer can be prepared by mixing together the silylated polymer and any of the customary functional additives known to those skilled in the art, such as one or more fillers, plasticizers, thixotropes, antioxidants, U.V. stabilizers, surfactants, defoamers, adhesion promoter(s) and/or cure catalyst.

Commercial incorporation of the moisture-curable polymer of the present invention include various forms of construction, automotive applications, consumer applications, industrial application, industrial assembly, polyurethane foams, e.g., as used for the insulation for roofs, tanks and pipes, transportation applications, e.g., RV's, subway cars, trailers and the like.

The components used in the inventive process can mixed with one another in any order. After the reaction has reached the desired degree of completion, the resulting hydrolyzable silylated polymer can be isolated and purified by methods known per se, i.e. by filtration, concentration by distillation, dilution with co-solvents, filtration and distillation.

In the following examples, all parts and percentages are, by weight, unless indicated otherwise, and are carried out at the pressure of the surrounding atmosphere, i.e. at about 1,000 hPa, and at a temperature usually performed in the range of 90-120° C. for a time period of 10-24 hrs. All viscosities reported in the examples are as measured at a temperature of 25° C. All reactions described in the examples were carried out under an inert gas atmosphere comprising nitrogen.

EXAMPLE 1

Synthesis of Alpha-substituted Silyl-terminated Polypropylene Glycol

A solution/dispersion of 5.0 g chloromethyltrimethoxysilane, 2.9 g of potassium cyanate and 6.25 g of polypropylene glycol (Mn~425, available from Aldrich) in dry dimethylformamide (25 ml) was heated gradually from 90 to 120° C. and allowed to reflux for 24 hours. The reaction is performed with addition of 50 ppm tin catalyst, dibutyltin dilaurate (DBTDL), after 6 hrs from the start of the reaction. Subsequently, the mixture was cooled to room temperature, filtered and concentrated. To this concentrated solution, toluene (100 ml) was added and the precipitated salt was filtered. The solvent was subsequently removed under vacuum to get alpha silyl terminated polypropylene glycol. The composition of the product was confirmed by FT-IR and FT-NMR analyses.

EXAMPLE 2

Synthesis of Alpha-substituted Silyl Terminated Polypropylene Glycol

The procedure described in Example-1 was performed with chloromethyltriethoxysilane, in place of chloromethyltrimethoxysilane.

EXAMPLE 3

Synthesis of Alpha-substituted Silyl-terminated Polypropylene Glycol

The procedure described in Example-1 was performed with chloromethylmethyldimethoxysilane, in place of chloromethyltrimethoxysilane.

EXAMPLE 4

Synthesis of Alpha-substituted Silyl-terminated Polypropylene Glycol

The procedure described in Example-1 was performed with chloromethylmethyldiethoxysilane, in place of chloromethyltrimethoxysilane.

EXAMPLE 5

Synthesis of Gamma-substituted Silyl-terminated Polypropylene Glycol (Method-1) A solution/dispersion of 5.8 g chloropropyltrimethoxysilane, 2.8 g of potassium cyanate and 6.2 g of polypropylene glycol (Mn~425, procured from Aldrich) in dry dimethylformamide (25 ml) was heated gradually from 90-120° C. and allowed to reflux for 24 hours. The reaction is performed with addition of 50 ppm tin catalyst (dibutyltin dilaurate (DBTDL) after 6 hrs from the start of the reaction. Subsequently, the mixture was cooled to room temperature, filtered and concentrated. To this concentrated solution, toluene (100 ml) was added and the precipitated salt was filtered. The solvent was subsequently removed under vacuum to get gamma silyl terminated polypropylene glycol. The composition of the product was confirmed by FT-IR and FT-NMR analysis.

COMPARATIVE EXAMPLE 1

Synthesis of Gamma-substituted Silyl-terminated Polypropylene Glycol (Method-2) A mixture of 10.0 g of polypropylene glycol (available from Aldrich, Mn~425), 9.64 g of isocyanatopropyltrimethoxysilane (available from GE-Silicones, Trade name: A link-35) and 50 ppm of tin catalyst (dibutyltin dilaurate (DBTDL) taken in a RB flask fitted with a condenser and a magnetic stirrer was stirred under nitrogen atmosphere at 80 to 85° C. for 5 hr to get the desired product. The composition of the product was confirmed by FT-IR and FT-NMR analysis.

EXAMPLE 6

Synthesis of Alpha-substituted Silyl-terminated Polypropylene Glycol

The procedure described in Example-1 was performed with required mole equivalent of polypropylene glycol (Mn~2700, available from Aldrich), instead of polypropylene glycol (Mn~425).

COMPARATIVE EXAMPLE 2

Synthesis of Gamma-substituted Silyl-terminated Polypropylene Glycol

The procedure described in Comparative Example-1 was performed with required mole equivalent of polypropylene glycol (Mn~2700, available from Aldrich), instead of polypropylene glycol (Mn~425).

EXAMPLE 7

Synthesis of Alpha-substituted Silyl-terminated Polyurethane

The procedure described in Example-1 was performed with required mole equivalent of hydroxyl group terminated polyurethane obtained by reacting mole excess of polypropylene glycol (Mn~425, available from Aldrich) with isoprone diisocyante (available from Aldrich), instead of polypropylene glycol.

EXAMPLE 8

Synthesis of Alpha-substituted Silyl-terminated Polyurethane

The procedure described in Example-7 was performed with required mole equivalent of chloromethyltriethoxysilane, instead of chloromethyltrimethoxysilane.

EXAMPLE 9

Synthesis of Alpha-substituted Silyl-terminated Polyurethane

The procedure described in Example-1 was performed with required mole equivalent of hydroxyl group terminated polyurethane obtained by reacting mole excess of polypropylene glycol (Mn~2700, available from Aldrich) with isoprone diisocyante (available from Aldrich), instead of polypropylene glycol.

EXAMPLE 10

Synthesis of Gamma-substituted Silyl-terminated Polyurethane

The procedure described in Example-5 (Method-1) was performed with required mole equivalent of hydroxyl group terminated polyurethane obtained by reacting mole excess of polypropylene glycol (Mn~425, available from Aldrich) with isoprone diisocyante (available from Aldrich), instead of polypropylene glycol.

COMPARATIVE EXAMPLE 3

Synthesis of Gamma-substituted Silyl-terminated Polyurethane

The procedure described in Comparative Example-1 (Method-2) was performed with required mole equivalent of hydroxyl group terminated polyurethane obtained by reacting mole excess of polypropylene glycol (Mn~425, available from Aldrich) with isoprone diisocyante (available from Aldrich), instead of polypropylene glycol.

COMPARATIVE EXAMPLE 4

Synthesis of Gamma-substituted Silyl-terminated Polyurethane

The procedure described in Comparative Example-1 (Method-2) was performed with required mole equivalent of hydroxyl group terminated polyurethane obtained by reacting mole excess of polypropylene glycol (Mn~2700, available from Aldrich) with isoprone diisocyante (available from Aldrich), instead of polypropylene glycol

EXAMPLES 11-18, COMPARATIVE EXAMPLES 5-8

The utility of the hydrolyzable silylated polymers was demonstrated by measuring the tack-free times. The procedure involved casting a film using a film applicator that was 2.5 mm (0.1 inch) thick and recording the time under ambient temperature and humidity, about 25° C. and 50 percent relative humidity, when the film was no longer tacky to the touch using an index finger. The results are presented in Table 1.

Table 1: Tack-free times for the silylated polymers of the present invention.

TABLE 1

| Example No. | Silylated Polymer from Example No. | Catalysts concentration, ppm (dibutyltin dilaurate) | Tack-free time, minutes |
|---|---|---|---|
| EXAMPLE 11 | EXAMPLE 1 | 50 | 5 |
| EXAMPLE 12 | EXAMPLE 2 | 50 | 78 |
| EXAMPLE 13 | EXAMPLE 6 | 50 | 2,880 |
| EXAMPLE 14 | EXAMPLE 7 | 50 | 30 |
| EXAMPLE 15 | EXAMPLE 8 | 50 | 1,440 |
| EXAMPLE 16 | EXAMPLE 9 | 50 | 1,080 |
| EXAMPLE 17 | EXAMPLE 5 | 50 | 7,200 |
| COMPARATIVE EXAMPLE 5 | COMPARATIVE EXAMPLE 1 | 50 | 7,200 |
| COMPARATIVE EXAMPLE 6 | COMPARATIVE EXAMPLE 2 | 50 | 31,700 |
| EXAMPLE 18 | EXAMPLE 10 | 1000 | 5,760 |
| COMPARATIVE EXAMPLE 7 | COMPARATIVE EXAMPLE 3 | 1000 | 5,760 |

TABLE 1-continued

| Example No. | Silylated Polymer from Example No. | Catalysts concentration, ppm (dibutyltin dilaurate) | Tack-free time, minutes |
|---|---|---|---|
| COMPARATIVE EXAMPLE 8 | COMPARATIVE EXAMPLE 4 | 1000 | 7,200 |

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A process for making moisture curable and hydrolyzable silylated polymer which comprises reacting under substantially anhydrous conditions (a) at least one hydrolyzable halohydrocarbylsilane, (b) at least one salt of a cyanate, and (c) at least one active hydrogen containing polymer, and, optionally, at least one catalyst and/or inert solvent, and, optionally, at elevated temperatures.

2. The process of claim 1 wherein the hydrolyzable halocarbylsilane has the general formula:

$$YG^1SiX^1X^2X^3 \qquad (1)$$

wherein:
each occurrence of Y is independently selected from the group consisting of chloro, bromo and iodo;
each occurrence of $G^1$ is independently a divalent hydrocarbylene group, optionally containing heteroatom-substituted with one or more oxygen atoms, and selected from the group consisting of alkylene, alkenylene and aralkylene containing from 1 to 20 carbon atoms;
each occurrence of $X^1$ is independently a hydrolyzable group selected from the group consisting of $R^1O-$, $R^1C(=O)O-$, $R^1R^2C=NO-$, and $R^1R^2NO-$, wherein each occurrence of $R^1$, $R^2$ and $R^3$ is independently a monovalent hydrocarbyl selected from the group consisting of hydrogen, and alkyl, alkenyl, aryl, and aralkyl containing from 1 to 10 carbon atoms;
each occurrence of $X^2$ is independently selected from the group consisting of $R^1O-$, $R^1C(=O)O-$, $R^1R^2C=NO-$, $R^1R^2NO-$ and $R^3-$, wherein each occurrence of $R^1$, $R^2$ and $R^3$ is independently a monovalent hydrocarbyl selected from the group consisting of hydrogen, and alkyl, alkenyl, aryl, and aralkyl containing from 1 to 10 carbon atoms; and
each occurrence of $X^3$ is independently selected from the group consisting of $R^1O-$, $R^1C(=O)O-$, $R^1R^2C=NO-$, $R^1R^2NO-$ and $R^3-$, wherein each occurrence of $R^1$, $R^2$ and $R^3$ is independently a monovalent hydrocarbyl selected from the group consisting of hydrogen, and alkyl, alkenyl, aryl, and aralkyl containing from 1 to 10 carbon atoms.

3. The process of claim 2 wherein Y is selected from the group consisting of Cl—, Br— and I—, $G^1$ is a hydrocarbylene group in which the carbon atom that is substituted with the Y group is a primary carbon atom.

4. The process of claim 2 wherein $G^1$ contains at least two carbon atoms, the carbon atom adjacent to the carbon containing the Y group contains at least one hydrogen atom.

5. The process of claim 2 wherein $G^1$ is selected from the group consisting of methylene, ethylene, propylene, butylenes, 3-methyl pentylene, bis-(ethylene)cyclohexane, —CH$_2$CH═CH—, —CH$_2$CH═CHCH$_2$—, —CH$_2$CH$_2$CH(CH$_3$)═CH$_2$CH$_2$—, —CH$_2$CH$_2$—, —CH$_2$CH$_2$C$_6$H$_4$CH$_2$CH$_2$—, and —CH$_2$CH$_2$OC$_6$H$_4$OCH$_2$CH$_2$—.

6. The process of claim 2 wherein $X^1$ is selected from the group consisting of methoxy, ethoxy, isopropoxy, propoxy, and butoxy.

7. The process of claim 2 wherein $X^2$ and $X^3$ are selected from the group consisting of methoxy, ethoxy, isopropoxy, propoxy, butoxy, methyl, ethyl, propyl, phenyl, and 2-phenylethyl.

8. The process of claim 1 wherein the hydrolyzable halocarbylsilane is at least one selected from the group consisting of chloropropytrimethoxysilane, bromopropyltrimethoxysilane, chlorobutyldimethylethoxysilane, chloropropyltriethoxysilane, chloropropylmethyldimethoxysilane, chlorobutylphenylmethyl-n-propoxysilane, iodopropyltrimethoxysilane, chloromethyltriethoxysilane, chloromethyltrimethoxysilane, chloromethyltripropyloxysilane, chloronnethyldiethoxymethylsilane, methylchloromethyldimethoxysilane, chloromethydipropyloxymethyllsilane, chloromethylethoxydimethylsilane, chiorornethylmethoxydimethylsilane, triethoxychloromethylsilane, 2-chloroethyltriethoxysilane, 3-chloropropyltrimethoxysilane, 6-chlorohexyltripropoxysilane, 2-chloroethyldiethoxymethylsilane, 3-chloropropyldimethoxymethylsilane, 4-(2-chloroethyl)phenyldipropyloxymethylsilane, 2-chloroethylethoxydimethylsilane, and 3-chloropropylmethoxydimethylsilane.

9. The process of claim 1 wherein the cyanate is at least one selected from the group consisting of lithium cyanate, sodium cyanate, potassium cyanate, rubidium cyanate, barium cyanate, strontium cyanate, silver cyanate, lead cyanate, mercury cyanate, calcium cyanate, ammonium cyanate and phosphonium cyanate.

10. The process of claim 9 wherein the cyanate is potassium cyanate.

11. The process of claim 1 wherein the active hydrogen containing polymer is at least one selected from the group consisting of polyethylene glycol, polypropylene glycols, polyols based upon alpha-substituted glycols, hydroxyl group terminated polyurethanes, copolymers of polyethylene glycol and polypropylene glycol, copolymers of polyethylene glycol and polypropylene glycol, polyester polyols, polycarbonate polyols, polybutadiene diols, polycaprolactone diols, silanol, aliphatic diols with siloxane backbone, triols, tetraols, pentaols, primary amines, secondary amines, and carboxylic acids.

12. The process of claim 11 wherein the active hydrogen containing polymer is at least one selected from the group consisting of polyether polyol, polyetherester polyols, polyesterether polyols, polybutadiene polyols, acrylic component-added polyols, acrylic component-dispersed polyols, styrene-added polyols, styrene-dispersed polyols, vinyl-added polyols, vinyl-dispersed polyols, urea-dispersed polyols, polycarbonate polyols, polyoxypropylene polyether polyol, mixed poly (oxyethylene/oxypropylene) polyether polyol, polybutadienediols, polyoxyalkylene diols, polyoxyalkylene triols, polytetramethylene glycols, polycaprolactone diols, and polycaprolactone triols.

13. The process of claim 12 wherein the active hydrogen containing polymer has a number average molecular weight form about 300 to about 25,000.

14. The process of claim 13 wherein the active hydrogen containing polymer has a number average molecular weight from about 1,000 to about 16,000.

15. The process of claim 11 wherein the hydroxyl terminated polyurethane is prepared with a molar ratio of NCO to OH from about 0.2 to about 0.95.

16. The process of claim 1 wherein the solvent is at least one selected from the group consisting of acetone, N,N-dimethylformamide, dimethyl sulfoxide, N-methyl-2-pyrrolidone, gamma-butyrolactone, diethylene glycol dimethyl ether, and diethylene glycol diethyl.

17. The process of claim 16 wherein the solvent is N,N-dimethylformamide.

18. The process of claim 1 wherein the catalyst is a phase-transfer catalyst.

19. The process of claim 18 wherein the phase transfer catalyst is at least one selected from the group consisting of tetra-n-butylphosphonium bromide, tetra-n-butylphosphonium chloride, methyltri-n-butylphosphonium chloride, methyltri-n-butylphosphonium bromide, n-butyltriphenylphosphonium bromide, n-butyltriphenylphosphonium chloride, methyltriphenylphosphonium chloride and methyltriphenylphosphonium bromide.

20. The process of claim 19 wherein the phase transfer catalyst is at least one selected from the group consisting of methyltriphenylphosphonium chloride, n-butyltriphenylphosphonium bromide and tetra-n-butylphosphonium bromide.

21. The process of claim 1 further comprises at least one additional catalyst selected from the group consisting of tin, titanium, trialkyltin hydroxide, dialkyltin oxide, dialkyltin dialkoxide, or dialkyltin dichloride and combinations thereof.

22. The process of claim 21 wherein the catalyst is selected from the group consisting of trimethyltin hydroxide, tributyltin hydroxide, trioctyltin hydroxide, dibutyltin oxide, dioctyltin oxide, dilauryltin oxide, dibutyltin-bis (isopropoxide) dibutyltin-bis(2-dimethylaminopentylate), dibutyltin dichloride, dioctyltin dichloride, and combinations thereof.

23. The process of claim 1 wherein the solvent is present in an amount from about 100 to about 1000 weight percent based on amount of hydrolyzable halohydrocarbylsilane.

24. The process of claim 1 wherein the solvent is present in an amount from about 200 to about 800 weight percent based on amount of hydrolyzable halohydrocarbylsilane.

25. The process of claim 1 wherein the solvent is present in an amount from about 400 to about 600 weight percent based on amount of hydrolyzable halohydrocarbylsilane.

26. The process of claim 1 wherein the reaction temperature is from about 80 to about 140° C.

27. The process of claim 1 wherein the reaction temperature is from about 90 to about 120° C.

28. The process of claim 1 wherein the reaction temperature is from about 100 to about 110° C.

* * * * *